(12) United States Patent
Bae

(10) Patent No.: US 9,031,400 B2
(45) Date of Patent: May 12, 2015

(54) CAMERA WITH HOT SHOE UNIT

(71) Applicant: Samsung Electronics Co., Ltd., Suwon-si, Gyeonggi-do (KR)

(72) Inventor: Kuem Jong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 14/165,840

(22) Filed: Jan. 28, 2014

(65) Prior Publication Data

US 2014/0212120 A1 Jul. 31, 2014

(30) Foreign Application Priority Data

Jan. 29, 2013 (KR) .................. 10-2013-0009578

(51) Int. Cl.
*G03B 15/03* (2006.01)
*G03B 15/05* (2006.01)

(52) U.S. Cl.
CPC ....................... *G03B 15/05* (2013.01)

(58) Field of Classification Search
USPC ............ 396/176, 198, 199; 248/186.1, 186.2, 248/187.1
See application file for complete search history.

(56) References Cited

U.S. PATENT DOCUMENTS

| 4,187,021 A * | 2/1980 | Balser ........................ 396/422 |
| 8,019,214 B2 * | 9/2011 | Hwang ....................... 396/198 |
| 2012/0189292 A1 * | 7/2012 | Kim et al. ................... 396/198 |

* cited by examiner

*Primary Examiner* — Clayton E LaBalle
*Assistant Examiner* — Warren K Fenwick
(74) *Attorney, Agent, or Firm* — Drinker Biddle & Reath LLP

(57) ABSTRACT

A camera includes a body and a hot shoe unit on which a strobe light is detachably installable. The hot shoe unit is rotatably installed on the body.

12 Claims, 9 Drawing Sheets

CAMERA WITH HOT SHOE UNIT

CROSS-REFERENCE TO RELATED APPLICATIONS

This application claims the priority benefit under 35 U.S.C. §119(a) from Korean Patent Application No. 10-2013-0009578, filed on Jan. 29, 2013 in the Korean Intellectual Property Office, the disclosure of which is incorporated herein by reference in its entirety.

BACKGROUND

1. Field

Embodiments of the present disclosure relate to a camera provided with a hot shoe used to install a strobe light.

2. Related Art

A camera represents an optical instrument to take a picture, and includes a body provided at a front surface thereof with a lens installed and a hot shoe provided at an upper side of the body to allow a strobe light to be detachably installed thereon.

Accordingly, by installing a strobe light through the hot shoe provided on the body of the camera such that the strobe light emits light in conjunction with the photographing, a photo is taken even at a dark place.

SUMMARY

Various embodiments of the present disclosure provide a camera capable of rotating a strobe light in left and right directions.

Other embodiments of the disclosure will be set forth in part in the description which follows and, in part, will be apparent from the description, or may be learned by practice of the disclosure.

In accordance with an embodiment of the present disclosure, a camera includes a body and a hot shoe unit. The hot shoe unit allows a strobe light to be detachably installed thereon. The hot shoe unit is rotatably installed on the body.

The hot shoe unit may include a hot shoe on which the strobe light is detachably installable, and a rotating member which is rotatably installed on the body. The hot shoe is disposed on an upper side of the rotating member.

The rotating member may be provided in a circular shape. The body may include a mounting recess formed in a circular shape that corresponds to the rotating member. The rotating member may be rotatably installed in the mounting recess.

The body may include a guide protrusion that protrudes in a circular ring shape at an inside of the mounting recess. The rotating member may include a guide groove formed in a lower surface of the rotating member in a circular ring shape to accommodate the guide protrusion.

The rotating member may include a cam surface formed in the guide groove in a circular ring shape by a plurality of concave parts formed in a circumferential direction of the guide groove. The body may include at least one ball supported against the cam surface, and at least one elastic member, corresponding to the at least one ball, that elastically biases the corresponding at least one ball against the cam surface.

The at least one ball may include a plurality of balls spaced apart from one another in the circumferential direction. The at least one elastic member may include a plurality of elastic members, corresponding to the plurality of balls, that elastically bias the plurality of balls, respectively.

The camera may further include a plurality of installation recesses formed in the guide protrusion and spaced apart from one another such that each of the plurality of installation recesses accommodates one of the plurality of elastic members and one of the plurality of balls.

The body may include a manipulation opening provided at a rear side of the mounting recess to allow a rear side of the rotating member to be exposed.

The rotating member may be formed in a regular polygon shape. The body may include a mounting groove formed in a regular polygon shape, corresponding to the rotating member, to be engaged with the rotating member.

The rotating member and the mounting groove may be formed in square shapes corresponding to each other.

The hot shoe unit may include a rotating shaft, which has an upper end installed on the rotating member and a lower end installed in a shaft recess on the body so as to guide up and down movement and rotation of the rotating member.

The hot shoe unit may include an elastic member that elastically biases the rotating member downwards.

As is apparent from the above, the hot shoe unit is rotatably installed at the body, and by rotating the hot shoe unit, a strobe light installed on the hot shoe may be rotated in left and right directions together with the hot shoe, thereby emitting light in various directions.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
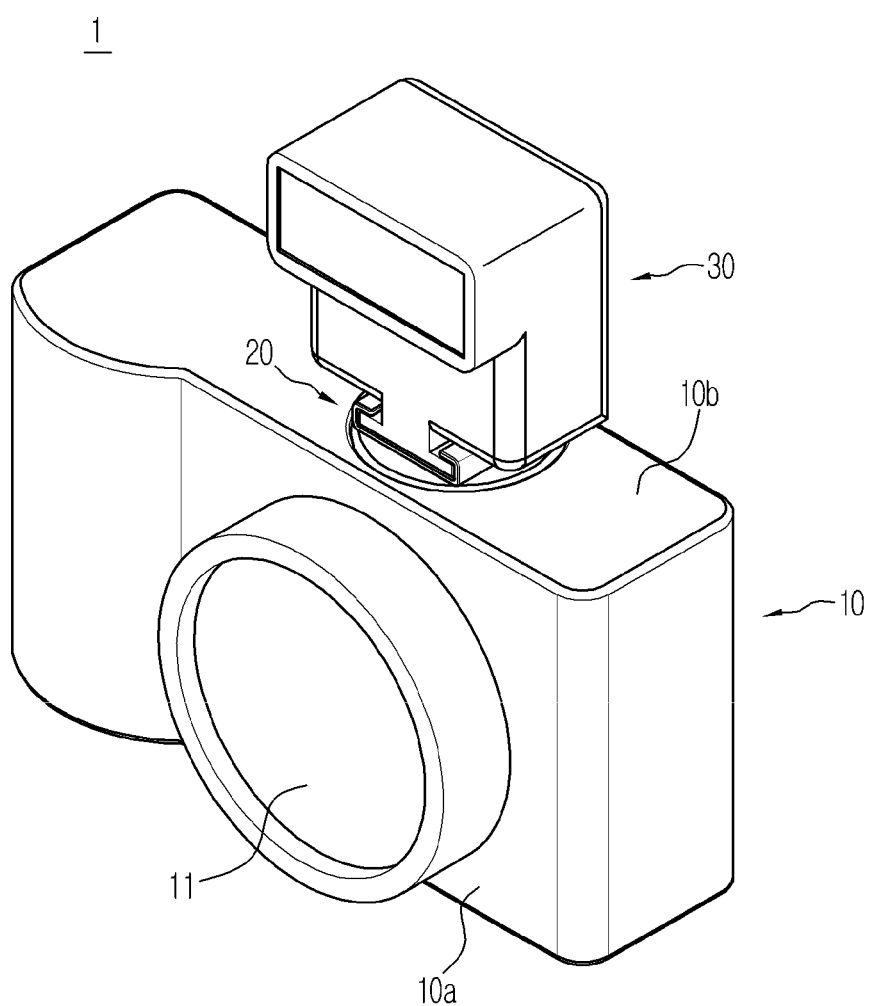
FIG. 1 is a perspective view illustrating a camera in accordance with an embodiment of the present disclosure.

Reference will now be made in detail to the embodiments of the present disclosure, examples of which are illustrated in the accompanying drawings, wherein like reference numerals refer to like elements throughout.

Referring to FIG. 1, a camera 1 in accordance with an embodiment of the present disclosure includes a body 10 that includes a lens 11 disposed on a front surface 10a of the body 10 and a hot shoe unit 20 disposed on an upper surface 10b of the body 10 such that a strobe light 30 is detachably installable on the body 10.

Figure 2:
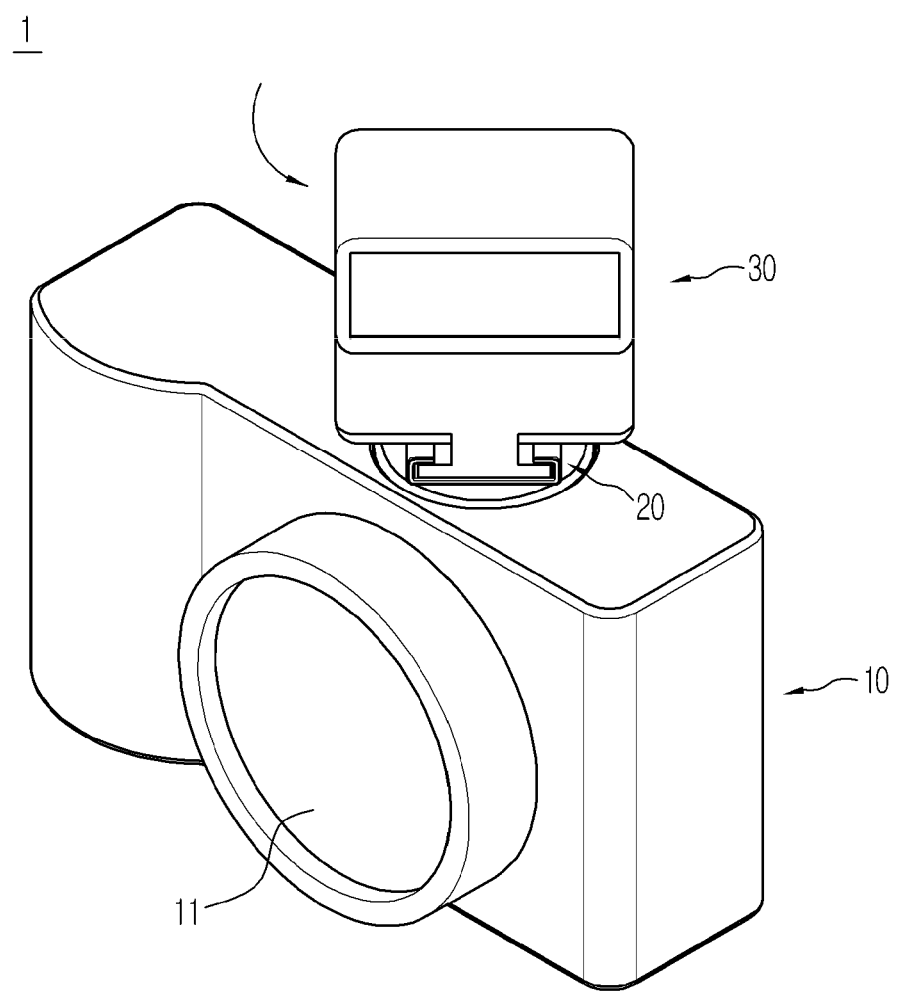
FIG. 2 is a perspective view illustrating an operation state of the camera in accordance with an embodiment of the present disclosure.

The hot shoe unit 20 is rotatably installed on the body 10 so as to allow rotation in left and right directions. The hot shoe unit 20 is rotatably installed on the body 10, and as the hot shoe unit 20 is rotated in left and right directions, a strobe light 30 installed on the hot shoe unit 20 is rotated in left and right directions as shown in FIG. 2, so that the strobe light 30 may emit light in left and right directions as well as in a frontal direction.

Figure 3:
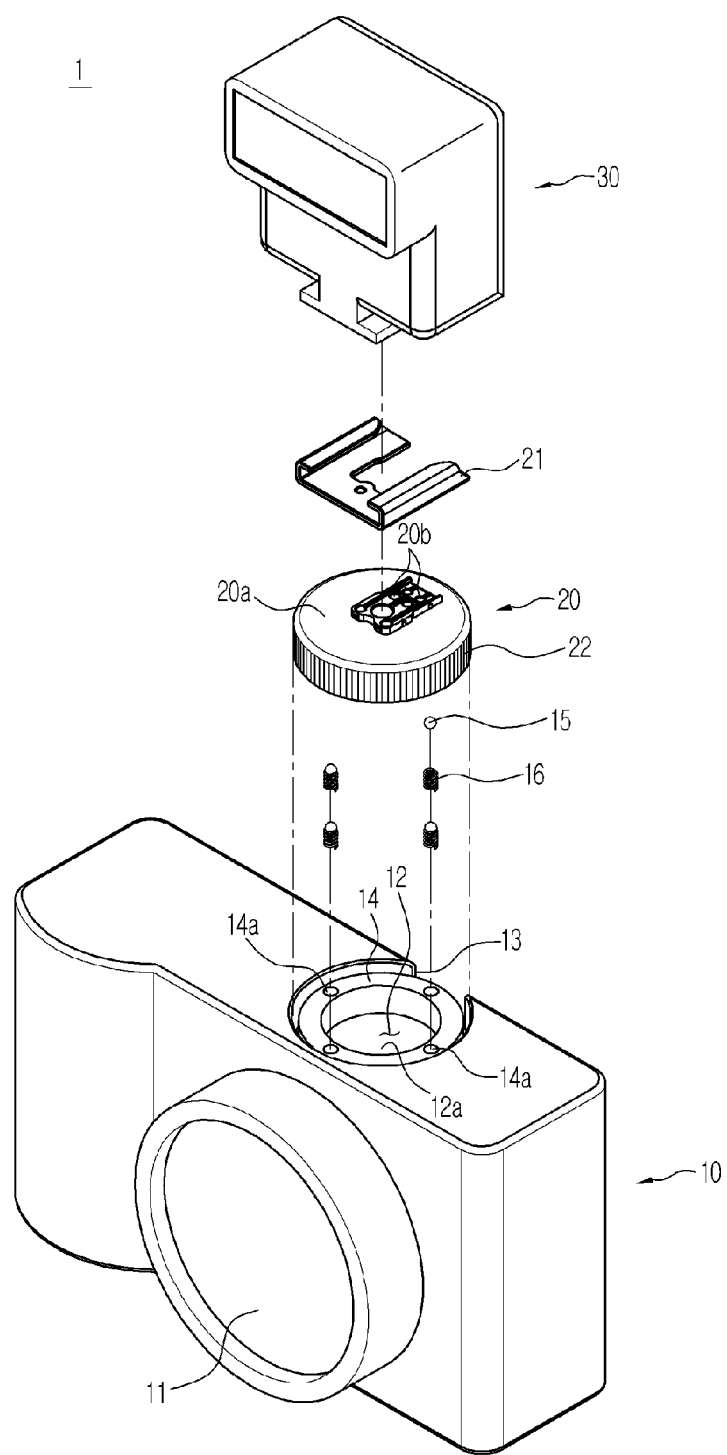
FIG. 3 is an exploded perspective view illustrating the camera in accordance with an embodiment of the present disclosure.
Figure 4:
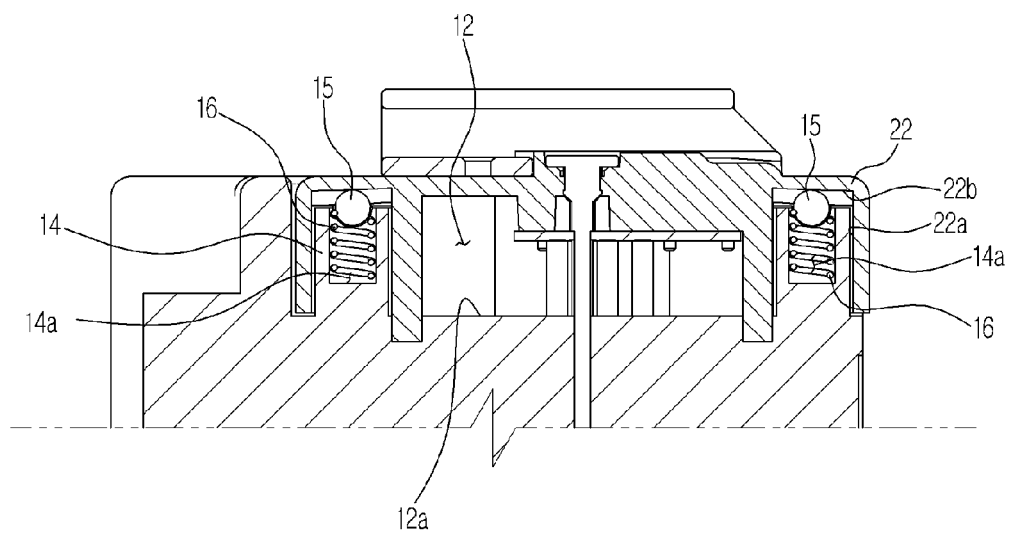
FIG. 4 is a partial cross sectional view illustrating an installed state of a hot shoe unit of the camera in accordance with an embodiment of the present disclosure.

Referring to FIGS. 3 and 4, the hot shoe unit 20 includes a hot shoe 21 on which the strobe light 30 is detachably installed and a rotating member 22. The rotating member 22 is rotatably installed on the body 10 while having a circular shape. The hot shoe 21 is disposed on an upper side 20a of the rotating member 22. Various connection terminals 20b are disposed on the rotating member 22 to connect to the strobe light 30 installed on the hot shoe 21.

The upper surface 10b of the body 10 is formed with a mounting recess 12 with a circular shape to correspond to the rotating member 22, such that the rotating member 22 is rotatably installed in the mounting recess 12. In this case, a manipulation opening 13 is formed at a rear side of the mounting recess 12 to expose a rear side of the rotating member 22. A user may rotate the rotating member 22 by applying a force to a rear side of the rotating member 22 accessible through the manipulation opening 13.

As described above, since the hot shoe unit 20 is installed on the body 10 so as to be rotatable in left and right directions via the rotating member 22, the strobe light 30 installed on the hot shoe 21 is rotatable by rotating the hot shoe unit 20 in left and right directions.

A guide protrusion 14 is formed at an inside of the mounting recess 12, protruding from a lower surface 12a of the mounting recess 12 in a circular ring shape so as to guide the rotation of the rotating member 22. A guide groove 22a is formed in a lower surface of the rotating member 22 in a circular ring shape corresponding to the guide protrusion 14 such that the guide protrusion 14 is inserted into the guide groove 22a upon installation of the rotating member 22. Accordingly, the rotating member 22, while installed in the mounting recess 12, is rotatable along the guide protrusion 14 installed in the guide groove 22a.

Figure 5:
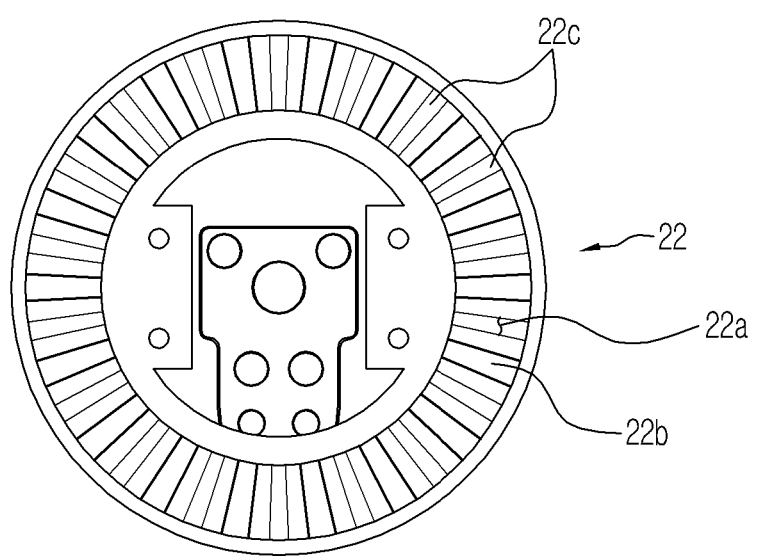
FIG. 5 is a bottom view illustrating a rotating member applied to the camera in accordance with an embodiment of the present disclosure.

The hot shoe unit 20 may be configured to be rotated only when desired, and thus the hot shoe unit 20 in this case is installed on the body 10 so as to be rotatable with respect to the body 10 only when a predetermined level of force (or above) is applied. A ball 15 and an elastic member 16, disposed on a lower side of the ball 15 and elastically biasing the ball 15 upwards (e.g., towards the rotating member 22), are installed on the body 10. The ball 15 is biased by the elastic member 16 against a cam surface 22b that is formed on the rotating member 22 in a ring shape as shown in FIG. 5.

The cam surface 22b is formed in the guide groove 22a by a plurality of concave parts 22c formed in a circumferential direction of the guide groove 22a. The elastic member 16 may be embodied as a coil spring as shown in FIGS. 3 and 4 such that a lower portion of the ball 15 is supported by an upper end of the elastic member 16. A plurality of balls 15 and elastic members 16 may be provided such that the plurality of balls 15 is elastically supported by the plurality of elastic members 16, respectively.

A plurality of installation recesses 14a are formed in the guide protrusion 14 for installation of the plurality of balls 15 and the plurality of elastic members 16. The installation recesses 14a are spaced apart from one another in the circumferential direction, and one of the plurality of elastic members 16 and one of the plurality of balls 15 are installed in each of the installation recesses 14a.

Accordingly, the ball 15, in a state of being biased against the cam surface 22b by an elastic force of the elastic member 16, does not generally allow rotation of the rotating member 22 while the ball 15 is engaged with a first concave part 22c provided on the cam surface 22b. If a user applies a sufficient force (e.g., the predetermined level of force) to the rotating member 22 to rotate the rotating member 22, the ball 15 is moved downwards by the first concave part 22c and then returns upwards to be engaged with a second concave part 22c, adjacent to the first concave part 22c, provided on the cam surface 22b.

Accordingly, the rotating member 22 rotates when receiving a predetermined level of force (or above), and if a force is not applied, the rotating member 22 maintains a state of forming a predetermined angle with respect to the body 10. Therefore, the strobe light 30 installed on the hot shoe unit 20 through the hot shoe 21 also maintains a state of forming a predetermined angle with respect to the body 10 before the predetermined level of force (or above) is applied, and rotates when the predetermined level of force (or above) is applied.

Figure 6:
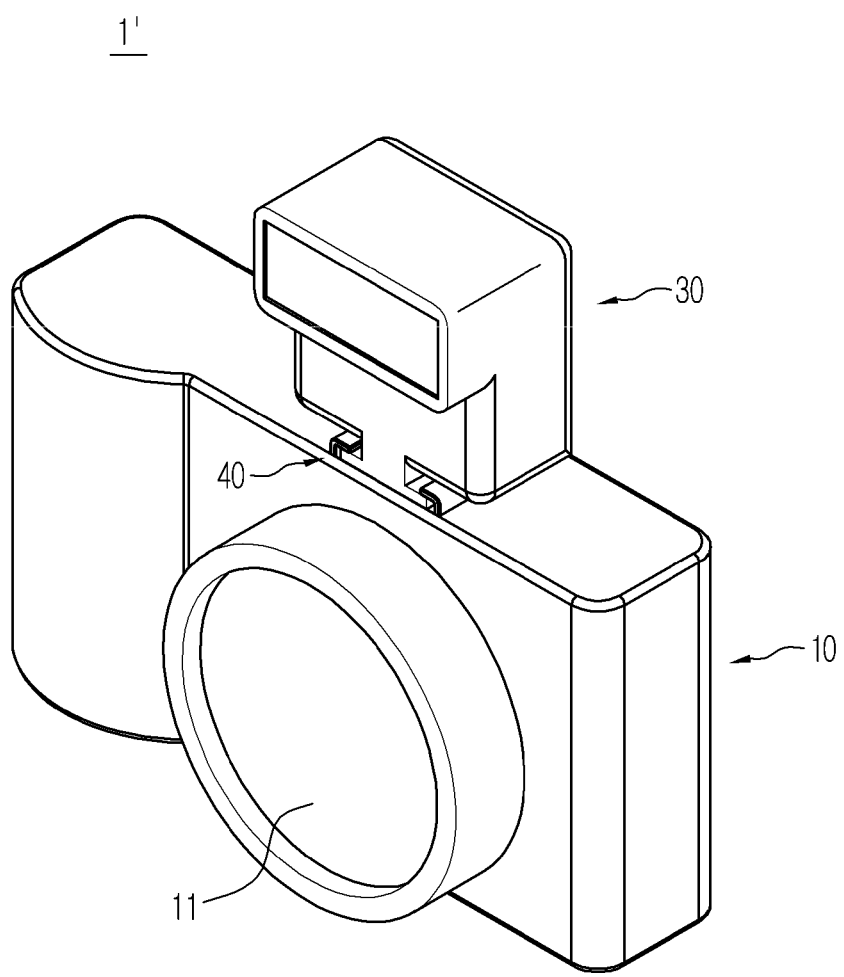
FIG. 6 is a perspective view illustrating a camera in accordance with another embodiment of the present disclosure.

Hereinafter, a camera 1' in accordance with another embodiment of the present disclosure will be described with reference to FIG. 6 in detail.

Figure 7:
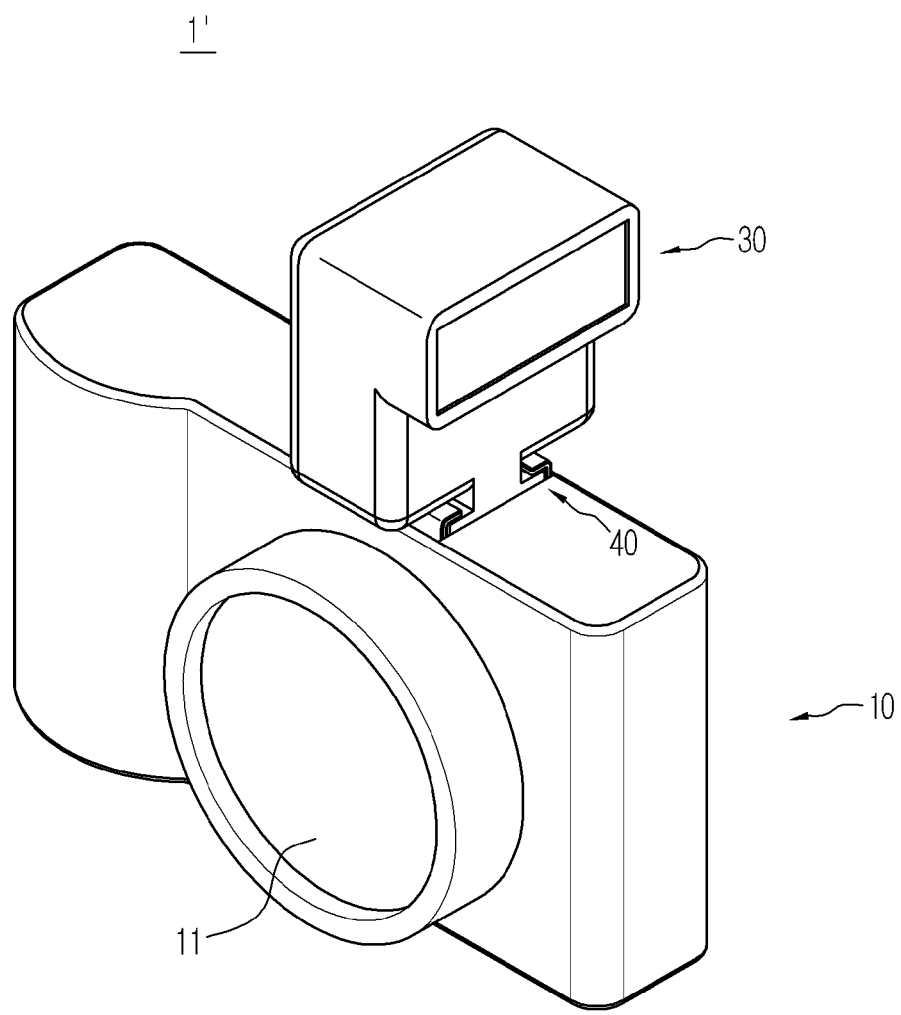
FIG. 7 is a perspective view illustrating an operation of the camera in accordance with another embodiment of the present disclosure.
Figure 8:
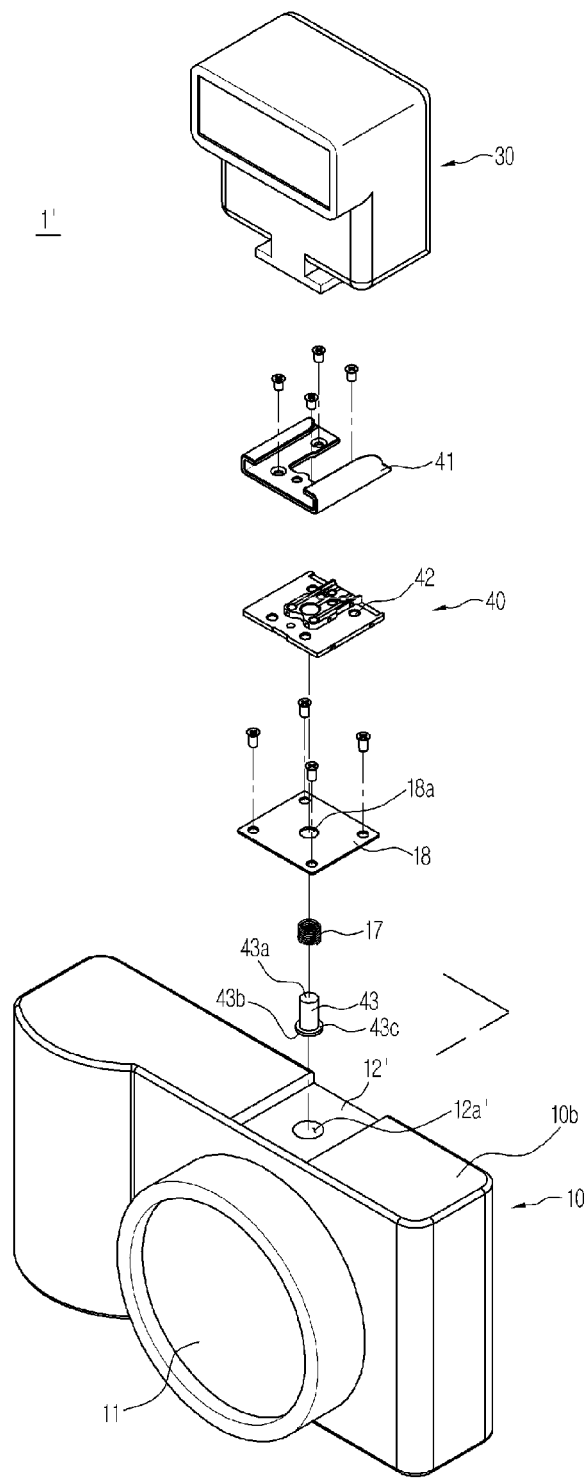
FIG. 8 is an exploded perspective view illustrating the camera in accordance with another embodiment of the present disclosure.
Figure 9:
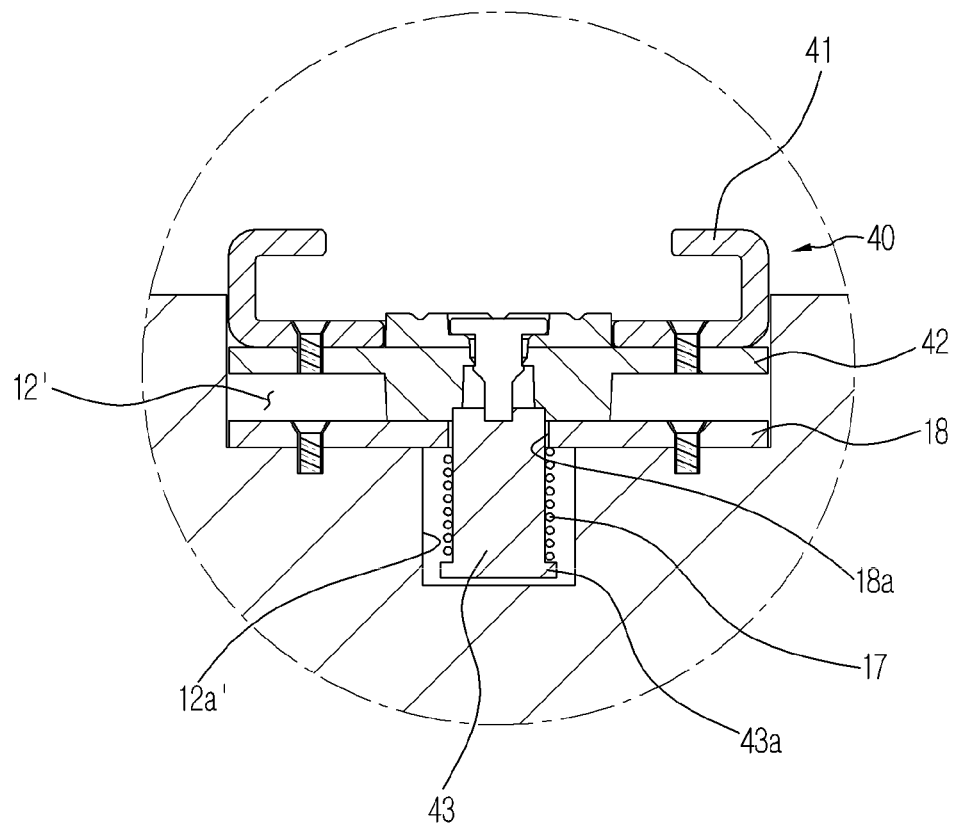
FIG. 9 is a cross sectional view illustrating an installed state of a hot shoe unit of the camera in accordance with another embodiment of the present disclosure.

Similar to the above embodiment, a hot shoe unit 40 is rotatably installed on the body 10, and while rotating, allows the strobe light 30 installed on the hot shoe unit 40 to be rotated in left and right directions as shown in FIGS. 7, 8, and 9.

The hot shoe unit 40 includes a hot shoe 41, on which the strobe light 30 is detachably installable, a rotating member 42 provided in a square shape, and a rotating shaft 43. The rotating shaft 43 has an upper end 43a fixedly installed on the rotating member 42 and a lower end 43b installed in a shaft recess 12a' on the body 10. The rotating shaft 43 enables up and down movement and rotation with respect to the body 10 to guide up and down movement and left and right direction rotation of the rotating member 42. The body 10 is formed at an upper surface 10b thereof with a mounting recess 12' in a square shape corresponding to the rotating member 42. Accordingly, the rotating member 42 does not rotate in a state of being accommodated in the mounting recess 12', and is rotatable in a state of being separated from the mounting recess 12'.

In order to maintain the state of the rotating member 42 accommodated in the mounting recess 12' and not being rotatable, the body 10 includes an elastic member 17 to elastically bias the rotating member 42 downwards.

The elastic member 17 may be embodied as a coil spring, and in order to install the elastic member 17 in this case, a support part 43c protrudes from the lower end 43b of the rotating shaft 43 to support a lower end of the elastic member 17. A support plate 18 is installed at a lower portion of the mounting recess 12' to support an upper end of the elastic member 17. The support plate 18 is formed with a through hole 18a allowing the rotating shaft 43 to pass therethrough. Accordingly, the lower end of the elastic member 17 is supported by the support part 43c, and the upper end of the elastic member 17 is supported by a portion of the support plate 18 adjacent to the through hole 18a, so that the rotating shaft 43 and the rotating member 42 to which the rotating shaft 43 is fixed are elastically biased downwards (e.g., towards the body 10).

Accordingly, as a force is applied to the rotating member 42 upwards, the elastic member 17 is elastically deformed and the rotating member 42 moves upwards to be separated from the mounting recess 12'. The rotating member 42, which is able to rotate in a state of being separated from the mounting recess 12', may be rotated in a left or right direction.

After the rotating member 42 is rotated, if the force applied to the rotating member 42 is removed, the rotating member 42 moves downwards, due to an elastic restoring force of the elastic member 17, and may be mounted in the mounting recess 12', bringing the rotating member 42 into a state that prevents the rotating member 42 from being rotated.

In this embodiment of the present disclosure, the rotating member 42 and the mounting recess 12' are provided in a square shape, and the rotating member 42 is rotatable in angle units of 90 degrees. That is, the rotation of the rotating member 42 may be made at an angle of 90 degrees, an angle of 180 degrees or an angle of 270 degrees.

Although the rotating member 42 in accordance with the embodiment shown in FIG. 8 is provided in the form of a square shape, the rotating member 42 and the mounting recess 12' may be formed in a regular polygon shape provided with each side in the same length, so that the strobe light 30 is rotatable at various angles. For example, in a case in which the rotating member 42 and the mounting recess 12' are provided in the form of a regular hexagon shape, the strobe light 30 may be rotated in angle units of 60 degrees, and in a case in which the rotating member 42 and the mounting recess 12' is provided in the form of a regular octagon shape, the strobe light 30 may be rotated in angle units of 45 degrees.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

Although various embodiments of the present disclosure have been shown and described, it will be appreciated by those skilled in the art that changes may be made in these embodiments without departing from the principles and spirit of the disclosure, the scope of which is defined in the claims and their equivalents.

What is claimed is:

1. A camera comprising:
   a body having a mounting recess; and
   a hot shoe unit on which a strobe light is detachably installable;
   wherein the hot shoe unit is rotatably installed on the body, the hot shoe unit having a rotating member which is rotatably installed in the mounting recess.

2. The camera of claim 1, wherein the hot shoe unit further comprises:
   a hot shoe on which the strobe light is detachably installable;
   wherein the hot shoe is disposed on an upper side of the rotating member.

3. The camera of claim 2, wherein:
   the rotating member is provided in a circular shape; and
   the mounting recess is formed in a circular shape that corresponds to the rotating member.

4. The camera of claim 3, wherein the body comprises a guide protrusion that protrudes in a circular ring shape at an inside of the mounting recess; and
   the rotating member comprises a guide groove formed in a lower surface of the rotating member in a circular ring shape to accommodate the guide protrusion.

5. The camera of claim 4, wherein the rotating member comprises a cam surface formed in the guide groove in a circular ring shape by a plurality of concave parts formed in a circumferential direction of the guide groove; and
   the body comprises at least one ball supported against the cam surface, and at least one elastic member, corresponding to the at least one ball, that elastically biases the corresponding at least one ball against the cam surface.

6. The camera of claim 5, wherein the at least one ball comprises a plurality of balls spaced apart from one another in the circumferential direction, and
   the at least one elastic member comprises a plurality of elastic members, corresponding to the plurality of balls, that elastically bias the plurality of balls, respectively.

7. The camera of claim 5, further comprising a plurality of installation recesses formed in the guide protrusion and spaced apart from one another such that each of the plurality of installation recesses accommodates one of the plurality of elastic members and one of the plurality of balls.

8. The camera of claim 3, wherein the body comprises a manipulation opening provided at a rear side of the mounting recess to allow a rear side of the rotating member to be exposed.

9. The camera of claim 1, wherein the rotating member is formed in a regular polygon shape; and the mounting recess is formed in a regular polygon shape, corresponding to the rotating member, to be engaged with the rotating member.

10. The camera of claim 9, wherein the rotating member and the mounting recess are formed in square shapes corresponding to each other.

11. The camera of claim 9, wherein the hot shoe unit comprises a rotating shaft having an upper end installed on the rotating member and a lower end installed in a shaft recess on the body so as to guide up and down movement and rotation of the rotating member.

12. The camera of claim 9, wherein the hot shoe unit comprises an elastic member that elastically biases the rotating member downwards.

\* \* \* \* \*